United States Patent [19]

Kaneko et al.

[11] Patent Number: 5,214,588

[45] Date of Patent: May 25, 1993

[54] CONTROL APPARATUS FOR AN FMS LINE

[75] Inventors: Kuniya Kaneko; Tsunezi Suzuki, both of Toyota; Tadashi Naito, Nagoya, all of Japan

[73] Assignee: Toyota Jidosha Kabushiki Kaisha, Aichi, Japan

[21] Appl. No.: 517,044

[22] Filed: May 1, 1990

[30] Foreign Application Priority Data

May 2, 1989 [JP] Japan .................................. 1-112069

[51] Int. Cl.⁵ .............................................. G06F 15/46
[52] U.S. Cl. ...................................... 364/468; 364/478
[58] Field of Search ............... 364/468, 469, 478, 479; 29/568, 771, 783, 784, 430, 563, 33 P; 235/375; 198/340, 341, 349

[56] References Cited

U.S. PATENT DOCUMENTS

| | | | |
|---|---|---|---|
| 4,472,783 | 9/1984 | Johnstone et al. | 364/478 |
| 4,591,991 | 5/1986 | Sticht | 364/468 |
| 4,621,410 | 11/1986 | Williamson | 364/468 |
| 4,821,198 | 4/1989 | Takeuchi et al. | 364/468 |
| 4,827,423 | 5/1989 | Beasley et al. | 364/468 |
| 4,894,908 | 1/1990 | Haba, Jr. et al. | 29/783 |

FOREIGN PATENT DOCUMENTS

| | | |
|---|---|---|
| 0044565A3 | 1/1982 | European Pat. Off. . |
| 60-172449 | 9/1985 | Japan . |
| 61-44565 | 3/1986 | Japan . |
| 62-74558 | 4/1987 | Japan . |
| 1202361 | 8/1970 | United Kingdom . |

OTHER PUBLICATIONS

Japanese Patent Publication No. HEI 2-109665.
Japanese Patent Publication No. HEI 2-205457.

*Primary Examiner*—Jerry Smith
*Assistant Examiner*—Thomas E. Brown
*Attorney, Agent, or Firm*—Finnegan, Henderson, Farabow, Garrett and Dunner

[57] ABSTRACT

A control apparatus provided for an FMS line having a robot for carrying a workpiece and an AGV for carrying a jig to be coupled to the workpiece. The control apparatus generally includes a production instruction device and an AGV movement control device. The production instruction device determines a schedule for supplying jigs on the basis of a work supply order schedule. The AGV movement control device causes an AGV to skip an unavailable station and to move to an available station in accordance with the presence or absence of a workpiece and/or a jig and a kind of a cell to which the AGV is to be moved. The robot operates continuously in the order of the disposition of cells. According to the structure, simplification and cost reduction of the control apparatus are attained.

11 Claims, 10 Drawing Sheets

FIG.3

| MONTH SERIES NUMBER | WORKPIECE TYPE NUMBER | CELL NUMBER | JIG NUMBER |
|---|---|---|---|
| 10 | 11101 -43031 -00 | 1 | |
| 9 | 11113 -43010 -00 | 2 | |
| 8 | 11101 -74011 -00 | 3 | |
| 7 | 11103 -63020 -00 | 4 | |
| 0 | | | |
| 10 | 11101 -43031 -00 | 2 | |
| 9 | 11113 -43010 -00 | 3 | |
| 8 | 11101 -74011 -00 | 4 | |
| 0 | | | |
| 0 | | | |
| 10 | 11101 -43031 -00 | 3 | |
| 0 | | | |
| 0 | | | |
| 0 | | | |
| 10 | 11101 -43031 -00 | 4 | |
| 0 | | | |
| | | | |
| | | | |

| MONTH SERIES NUMBER | WORKPIECE TYPE NAME | WORKPIECE TYPE NUMBER |
|---|---|---|
| 11 | 1S CAM HOUSING | 11103 -63020 -00 |
| 12 | 2S HEAD | 11101 -74011 -00 |
| 13 | 5MG CAM HOUSING | 11113 -43010 -00 |
| 14 | 5MG HEAD | 11101 -43031 -00 |

FIG.5

| MONTH SERIES NUMBER | WORKPIECE TYPE NUMBER | CELL NUMBER | JIG NUMBER |
|---|---|---|---|
| 10 | 11101 -43031 -00 | 1 | |
| 9 | 11113 -43010 -00 | 2 | |
| 8 | 11101 -74011 -00 | 3 | |
| 7 | 11103 -63020 -00 | 4 | |
| 11 | 11103 -63020 -00 | 1 | |
| 10 | 11101 -43031 -00 | 2 | |
| 9 | 11113 -43010 -00 | 3 | |
| 8 | 11101 -74011 -00 | 4 | |
| 12 | 11101 -74011 -00 | 1 | |
| 11 | 11103 -63020 -00 | 2 | |
| 10 | 11101 -43031 -00 | 3 | |
| 13 | 11113 -43010 -00 | 1 | |
| 12 | 11101 -74011 -00 | 2 | |
| 11 | 11103 -63020 -00 | 3 | |
| 10 | 11101 -43031 -00 | 4 | |
| 14 | 11101 -43031 -00 | 1 | |
| 13 | 11113 -43010 -00 | 2 | |
| 12 | 11101 -74011 -00 | 3 | |
| 11 | 11103 -63020 -00 | 4 | |
| | | 1 | |
| 14 | 11101 -43031 -00 | 2 | |
| 13 | 11113 -43010 -00 | 3 | |
| 12 | 11101 -74011 -00 | 4 | |

FIG. 7

A: SUPPLYING OF A JIG
B: PRESENCE OF A JIG
C: PRESENCE OF A JIG WITH A WORKPIECE

204

| | | JIG STOCKER | | Li | | | Vi | | | BLi | | BVi | |
|---|---|---|---|---|---|---|---|---|---|---|---|---|---|
| | | A | Ā | B | C | $\overline{B/C}$ | B | C | $\overline{B/C}$ | C | $\overline{C}$ | C | $\overline{C}$ |
| JIG STOCKER | A | | | $R_1$ | $R_2$ | $R_3$ | $R_4$ | $R_5$ | $R_6$ | $R_7$ | $R_8$ | $R_9$ | $R_{10}$ |
| | Ā | | | $R_{11}$ | $R_{12}$ | $R_{13}$ | $R_{14}$ | $R_{15}$ | $R_{16}$ | $R_{17}$ | $R_{18}$ | $R_{19}$ | $R_{20}$ |
| Li | B | | | | | | $R_{21}$ | $R_{22}$ | $R_{23}$ | $R_{31}$ | $R_{32}$ | $R_{33}$ | $R_{34}$ |
| | C | | | | | | $R_{24}$ | $R_{25}$ | $R_{26}$ | $R_{35}$ | $R_{36}$ | $R_{37}$ | $R_{38}$ |
| | $\overline{B/C}$ | | | | | | $R_{27}$ | $R_{28}$ | $R_{29}$ | $R_{39}$ | $R_{40}$ | $R_{41}$ | $R_{42}$ |
| Vi | B | | | | | | | | | $R_{43}$ | $R_{44}$ | $R_{45}$ | $R_{46}$ |
| | C | | | | | | | | | $R_{47}$ | $R_{48}$ | $R_{49}$ | $R_{50}$ |
| | $\overline{B/C}$ | | | | | | | | | $R_{51}$ | $R_{52}$ | $R_{53}$ | $R_{54}$ |
| BLi | C | | | | | | | | | | | $R_{55}$ | $R_{56}$ |
| | $\overline{C}$ | | | | | | | | | | | $R_{57}$ | $R_{58}$ |
| BVi | C | | | | | | | | | | | | |
| | $\overline{C}$ | | | | | | | | | | | | |

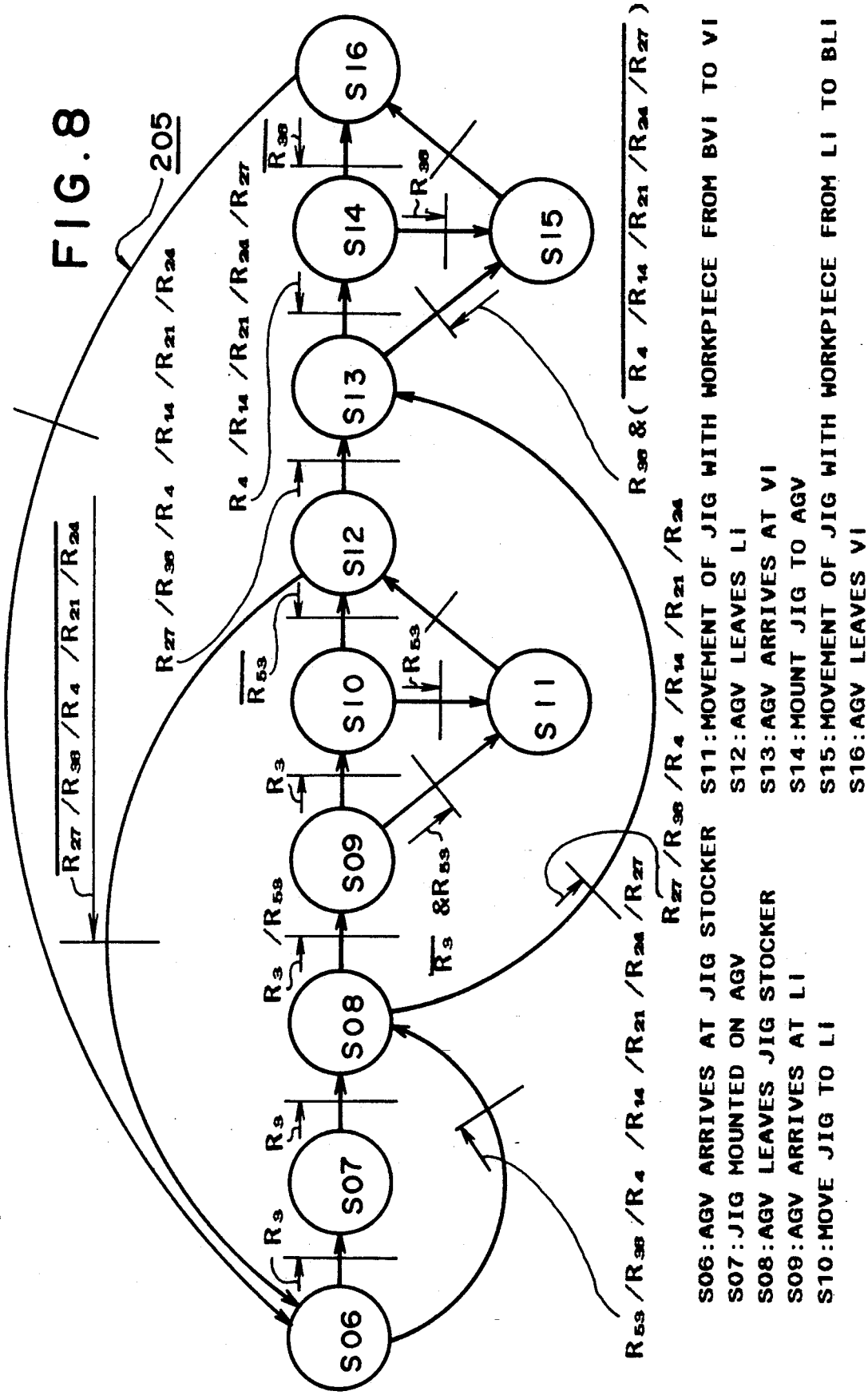

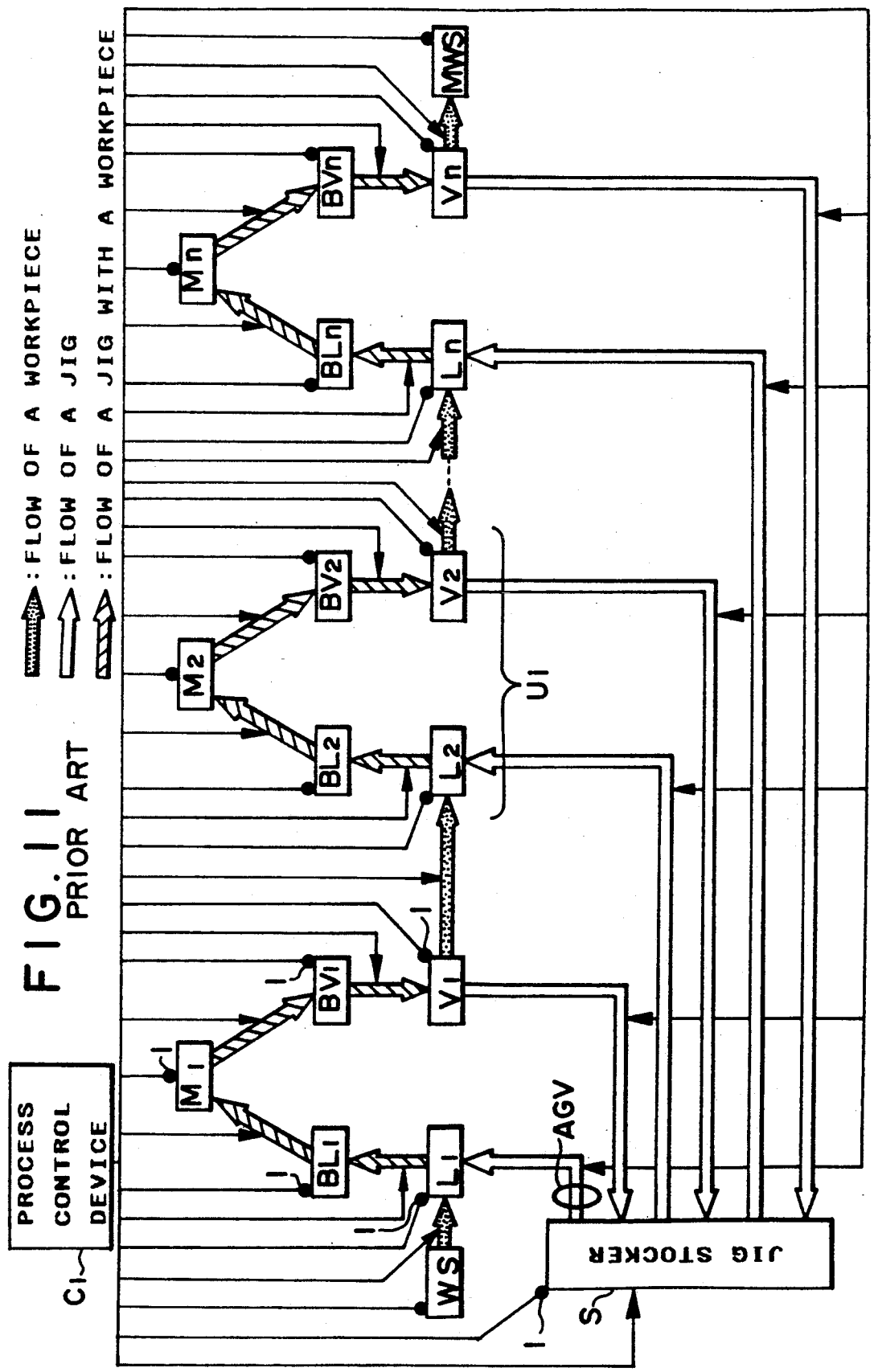

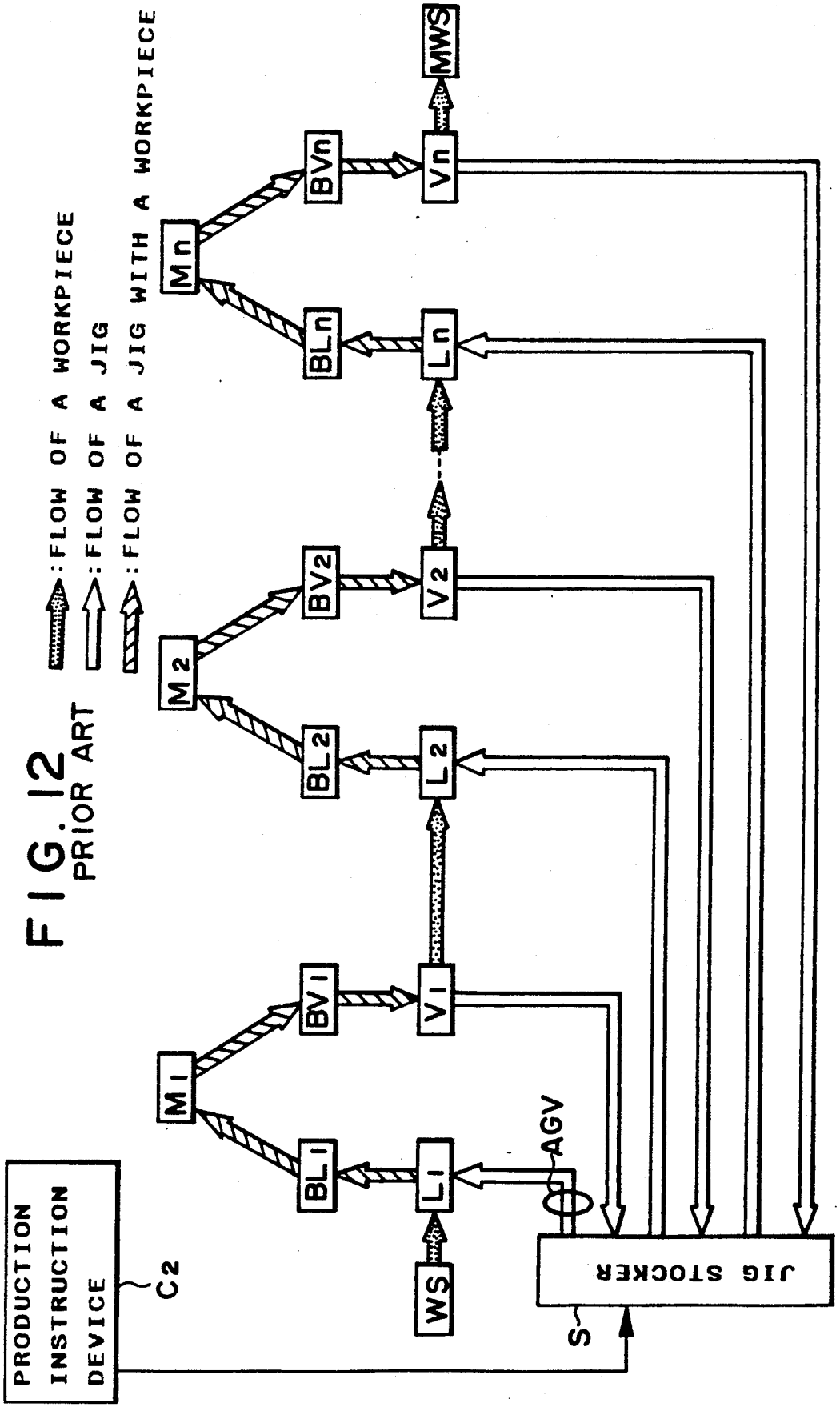

CONTROL APPARATUS FOR AN FMS LINE

BACKGROUND OF THE INVENTION

1. Field of the Invention

The present invention relates to a control apparatus for a flexible manufacturing system (FMS, hereinafter) line.

2. Description of the Prior Art

The physical components of a conventional FMS line are taught in Japanese Patent Publication SHO 60-172449, for example. As shown in FIGS. 11 and 12, conventional FMS lines generally include a plurality of cells U1, U2, ..., Un disposed in series. Each cell Ui includes a loading station Li, a loading buffer BLi, a machining center Mi, an unloading buffer BVi, and an unloading station Vi. Various kinds of works are successively supplied from a workpiece stocker WS to the FMS line and are finally expelled to a machined workpiece stocker MWS.

In the FMS lines of FIGS. 11 and 12, a workpiece is carried by a robot between the cells and is machined at the machining center Mi. For positioning the workpiece at a machining tool of the machining center, a jig is coupled to the workpiece. The appopriate jig is selected from among various kinds of jigs stocked in a jig stocker S corresponding to the kind of workpiece and the kind of machining center Mi and is carried from the jig stocker S to a loading station Li where the jig is coupled to the workpiece by the robot. The jig with the workpiece is then carried to a machining center Mi of the cell Ui and is machined. The jig with the machined workpiece is then carried to an unloading station Vi of the cell Ui where the jig is separated from the workpiece by the robot. The separated workpiece is then carried to a loading station Li+1 of the next cell Ui+1 by the robot, and the separated jig is returned to the jig stocker S. Carriage of the jig between the cell Ui and the jig stocker S is performed by an automatically guided vehicle (AGV, hereinafter).

Prior art control systems for FMS lines can be generally classified into two types: one shown in FIG. 11 and another shown in FIG. 12.

In the system of FIG. 11, an identification reader I reads not only the presence or absence of a workpiece and/or jig at each station of each cell but also the kind of workpiece and/or jig, when present. Therefore, the ID reader includes a sensor capable of identifying even the pattern of a workpiece and/or jig. In addition, all the workpieces and jigs on the FMS line are tracked, and the positions and kinds of all the workpieces and/or jigs are stored in a process control device C1 constructed of a computer of great capacity. Further, a very complicated electrical communication network is provided between the computer and the ID readers.

In the system of FIG. 12, workpieces are supplied from a workpiece stocker WS to the FMS line in accordance with a predetermined workpiece supply order schedule. Jigs are selected from a jig stocker S and the selected jigs are carried from the jig stocker S to a corresponding station of a cell of the line in accordance with instructions from a production instruction device C2. An AGV performs a predetermined routine along a fixed route.

However, the control systems of FIGS. 11 and 12 include the following problems:

(a) With respect to the system of FIG. 11:

(i) Because the ID reader should include a pattern recognizable sensor, the ID reader is very expensive.

(ii) Because the computer should have a great capacity and the communications network is very complicated, the computer and the network are very expensive.

(iii) Further, when a problem develops with the computer and/or the network, much more effort and time is needed for recovery. As a result, the line may be forced to stop for several days before operations can resume. (b) With respect to the system of FIG. 12:

(i) If no jig happens to be present at a station of the cell to which the AGV is moved, the AGV can no longer operate and remain stopped to cause a so-called dead lock.

(ii) For preventing such a dead lock from happening, each station of each cell must be filled with a sufficient number of spare jigs. However, because each jig is machined to very tight dimensions and is very expensive, provision of many spare jigs is not economical.

SUMMARY OF THE INVENTION

An object of the invention is to provide a control apparatus for an FMS line wherein a sensor, a computer, and a communication network can be simplified and almost no spare jigs need be provided at each station.

The above-described object can be attained by a control apparatus provided for an FMS line in accordance with the present invention which includes a machining line with a plurality of cells arranged in series, each cell including a loading station, a loading buffer, a machining center, an unloading buffer, and an unloading station. The FMS line includes a jig stocker which stocks jigs and has a jig exchanging device. Also, an AGV is provided for carrying each jig between the jig stocker and the machining line.

The control apparatus includes a production instruction device. This device plans and stores a jig supply order schedule for the current cycle of operation on the basis of a jig supply order schedule for the previous cycle of operation and a work supply order schedule for the current cycle of operation. The production instruction device searches the stored jig supply order schedule for the current cycle of operation upon receiving a datum request signal from the jig exchanging device and indicates a corresponding datum to the jig exchanging device.

An AGV movement control device is also provided for causing the AGV to move to an available station (defined as a station where the AGV can perform an operation), skipping an unavailable station, in accordance with (a) the presence or absence of a jig or a jig with a work at a loading station, a loading buffer, an unloading buffer, and an unloading station of a cell to which the AGV is to be moved and (b) a kind of a cell to which the AGV is to be moved.

Carriage of workpieces is predetermined such that a workpiece is not outrun by another workpiece on the machining line. A loading/unloading robot may be provided so as to move sequentially from each cell to the next adjacent cell so that the robot couples a jig to a workpiece at a loading station of one cell, then separates a jig from a workpiece at an unloading station of the same cell, and then carries the separated workpiece from the unloading station of the same cell to a loading station of the next cell. Leaving the last cell, the robot returns to the first cell.

In the above-described FMS line, various kinds of workpieces are supplied to the machining line. For the purpose of positioning each workpiece at each machining center, each workpiece is coupled with a corresponding jig at a loading station of each cell and the jig with a workpiece is moved through the loading buffer, the machining center, and the unloading buffer to the loading station of the cell where the jig and the workpiece are separated from each other. Each workpiece is carried by the loading/unloading robot (a single robot for all of a plurality of cells) between adjacent two cells. In contrast, each jig is carried between the jig stocker and the machining line by the AGV (a single AGV for all of a plurality of cells) and each jig with a workpiece is moved by the AGV from a loading station to a loading buffer and from an unloading buffer to unloading station. Workpieces are supplied to the machining line in accordance with the work piece supply order schedule independently of a jig supply order schedule. Supply of a jig corresponding to a workpiece is controlled by the control apparatus in accordance with the present invention.

The control apparatus generally includes two devices: the production instruction device and the AGV movement control device.

The production instruction device plans a jig supply order schedule for the current cycle of operation. The production instruction device searches the planned jig supply order schedule upon receiving a datum request signal from the jig exchanging device provided at the jig stocker to find which jig should be supplied. Upon receiving the instruction from the production instruction device, the jig exchanging device selects a jig to be supplied to a particular station of a particular cell and mounts the selected jig on the AGV when the AGV returns to the jig stocker so that the AGV can carry the jig to the particular station of the particular cell. The production instruction device plans the jig supply order schedule for the current cycle of operation on the basis of not only a work supply order schedule but also a jig supply order schedule for the previous cycle of operation, because the jigs and/or jigs, each with a jig (jigs with workpieces, hereinafter) belonging to the previous operating cycle remain on the FMS line.

The AGV movement control device causes the AGV to move from the jig stocker to an available station of the particular cell to perform an operation in accordance with a predetermined control flow. The control flow has skipping flow lines which skip steps belonging to a loading station and an unloading station so that if an object station is an unavailable station, the AGV can skip the steps of the unavailable station and go to the next, available station. Whether an object station is an available station or not is determined on the basis of the presence or absence of a jig and/or a jig with a workpiece at the object station and the kind of the cell including the object station (that is, whether or not the workpiece to which the jig is to be coupled should be machined at the machining center of the cell).

Since the jig supply order schedule for the current operating cycle is planned on the basis of the work supply order schedule for the current operating cycle and since the loading/unloading robot moves sequentially from each cell to the next adjacent cell (without skipping a cell), coincidence between the work supply order and the supplying of jigs is automatically obtained. Therefore, the jig selected at the jig stocker in accordance with the instruction from the production instruction device is necessarily carried to a corresponding station so that the jig is coupled with the corresponding workpiece. This timing does not require tracking of all the workpieces and jigs, unlike the prior art control system of FIG. 11, and thus, a computer of the AGV movement control device and the network between the computer and the sensors is decreased in scale and simplified. Further, the sensor at each station need not be a pattern recongnizable sensor but can be a sensor capable of recongnizing only the presence or absence of a jig and/or a jig with a workpiece. As a result, the sensors are less costly.

Since the AGV is controlled by the AGV movement control device so as to skip an unavailable station and proceed to the next available station, the AGV does not cause a dead lock unlike the control system of FIG. 12. More particularly, if a jig or a jig with a workpiece is not present at a station when the robot arrives at the station, the robot will continue to stay at the station until the AGV finally brings a jig or a jig with a workpiece to the station. Because the AGV finally brings a jig or a jig with a workpiece to the station, the robot operates again and does not cause a dead lock.

BRIEF DESCRIPTION OF THE DRAWINGS

The above and other objects, features and advantages of the present invention will become more apparent and will be more readily appreciated from the following detailed description of the preferred exemplary embodiments of the invention taken in conjunction with the accompanying drawings, in which:

FIG. 3 is a table illustrating one example of the contents of a file of the production instruction device of FIG. 2 including a schedule for supplying jigs for the previous cycle;

FIG. 5 is a table illustrating one example of the contents of a file of the pruduction instruction device of FIG. 2 including a schedule for supplying jigs for the current cycle;

FIG. 7 is a matrix diagram illustrating a decision table stored in the AGV movement control device of FIG. 6;

FIG. 8 is a control flow diagram stored in the AGV movement control device of FIG. 6;

FIG. 11 is a system diagram of one example of a prior art FMS line control system including a process control device; and FIG. 12 is a system diagram of another example of a prior art FMS line control system including a production instruction device.

PREFERRED EMBODIMENT OF THE PRESENT INVENTION

Figure 1:
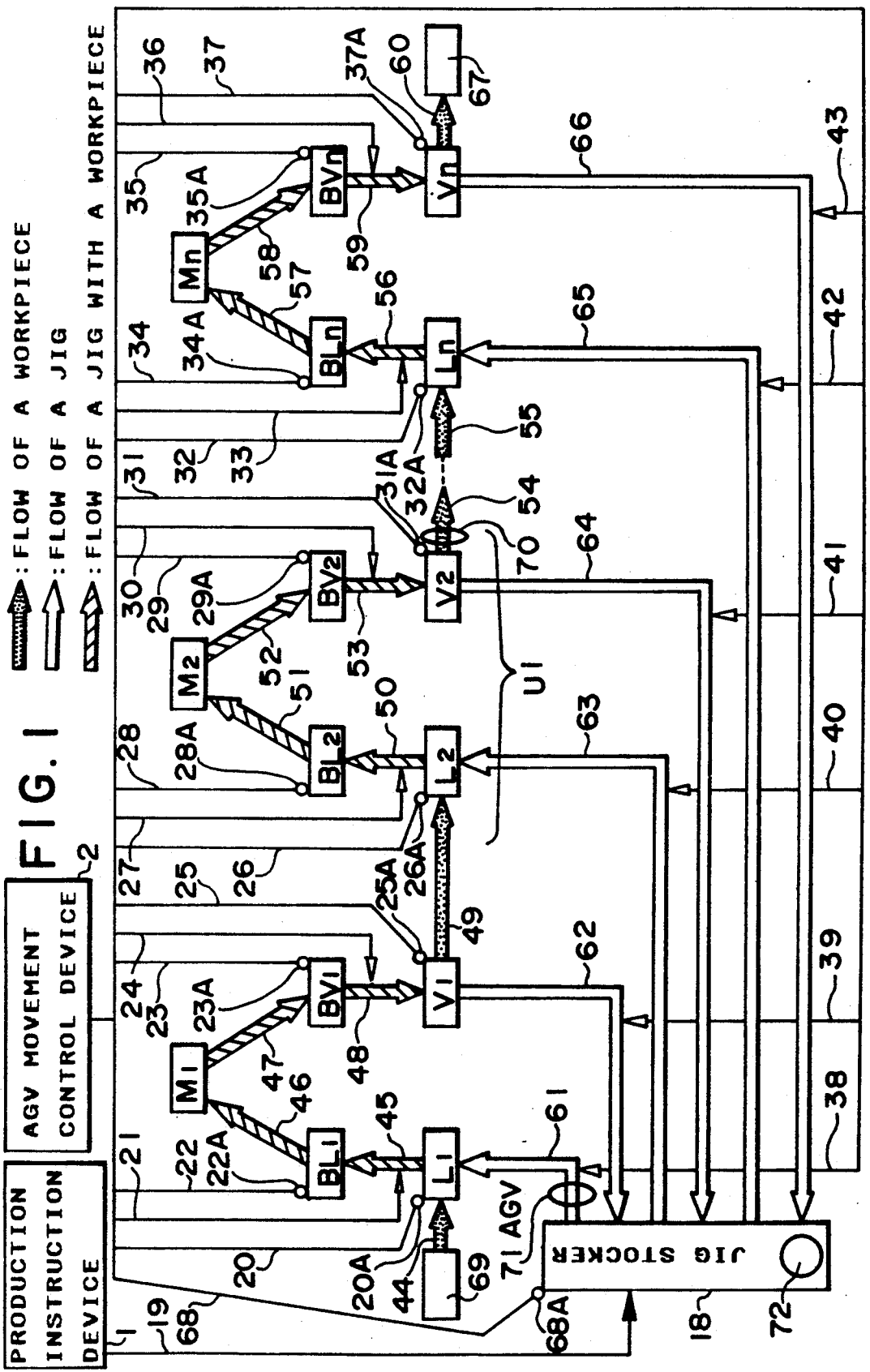
FIG. 1 is a system diagram of a control apparatus for an FMS line in accordance with one embodiment of the present invention.

As illustrated in FIG. 1, a machining line is sectioned into a plurality of cells Ui (i =1, 2, ..., n) disposed in series. A workpiece is brought into the first cell U1 from a workpiece stocker 69, and is then carried from a cell Ui to the next cell Ui+1, and is finally carried out from the last cell Un to a machined workpiece stocker 67.

Each cell Ui includes a loading station Li, a loading buffer LBi, a machining center Mi, an unloading buffer BVi, and an unloading station Vi, in that order. A jig is coupled to a workpiece at the loading station Li, and the jig with a workpiece is carried through the stations LBi, Mi, and BVi to the unloading station Vi where the jig is separated from the workpiece. The loading buffer BLi and the unloading buffer BVi are buffer stations for absorbing machining time differences between various kinds of workpieces. A single loading/unloading robot 70 is provided for all of the cells for causing the robot 70 to carry a workpiece between the cells, to carry a workpiece from the workpiece stocker 69 to the first cell, and the to carry a workpiece from the last cell to the machined workpiece stocker 67. A single AGV 71 is provided for all of the cells for causing the AGV 71 to carry each jig with a workpiece from the loading station Li to the loading buffer LBi and from the unloading buffer BVi to the unloading station Vi of each cell Ui.

In FIG. 1, workpiece carriage routes (including a workpiece with a jig) are denoted with reference numerals 44, 45, 46, 47, 48, 49, 50, 51, 52, 53, 54, 55, 56, 57, 58, 59, 60 in the order as shown in FIG. 1. A jig stocker 18 in FIG. 1 provides various kinds of jigs depending on the processing to be accomplished. The jig stocker 18 is provided with a rack divided into a plurality of sections in vertical and horizontal directions. Jigs are stocked in the sections of the rack. Jigs are selected by a jig exchanging device 72 provided for the jig stocker 18 and are mounted on the AGV 71. The jig exchanging device 72 is constructed of a fork type vehicle and operates in accordance with an instruction from a production instruction device 1 (discussed in more detail hereinafter).

Jigs are carried between the jig stocker 18 and each cell Ui of the machining line by the single AGV 71. The AGV 71 is automatically moved along an electro-magnetic induction line embedded in a floor and is controlled an AGV movement control device 2 (discussed in more detail hereinafter). The AGV 71 carries jigs along routes 61, 62, 63, 64, 65, and 66. As discussed above, the AGV 71 also moves a jig with a work from a loading station Li to a loading buffer BLi and from an unloading buffer BVi to an unloading station Vi.

The cells Ui including the stations Li, BLi, Mi, BVi, and Vi, the robot 70, and the AGV 71 are the physical components of the FMS line. A control apparatus is also provided for controlling the operation of the these components. More particularly, since workpieces are supplied to the machining line independently of the supply of jigs, the timing and order of jig supply must be controlled so that each jig is carried to a corresponding workpiece. The control apparatus of the present invention is an apparatus for controlling the jig supply.

As shown in FIG. 1, the control apparatus generally includes a production instruction device 1 and an AGV movement control device 2. In addition, an operation of the robot 70 is predetermined such that the robot 70 moves sequentially from each cell to the next adjacent cell.

Figure 2:
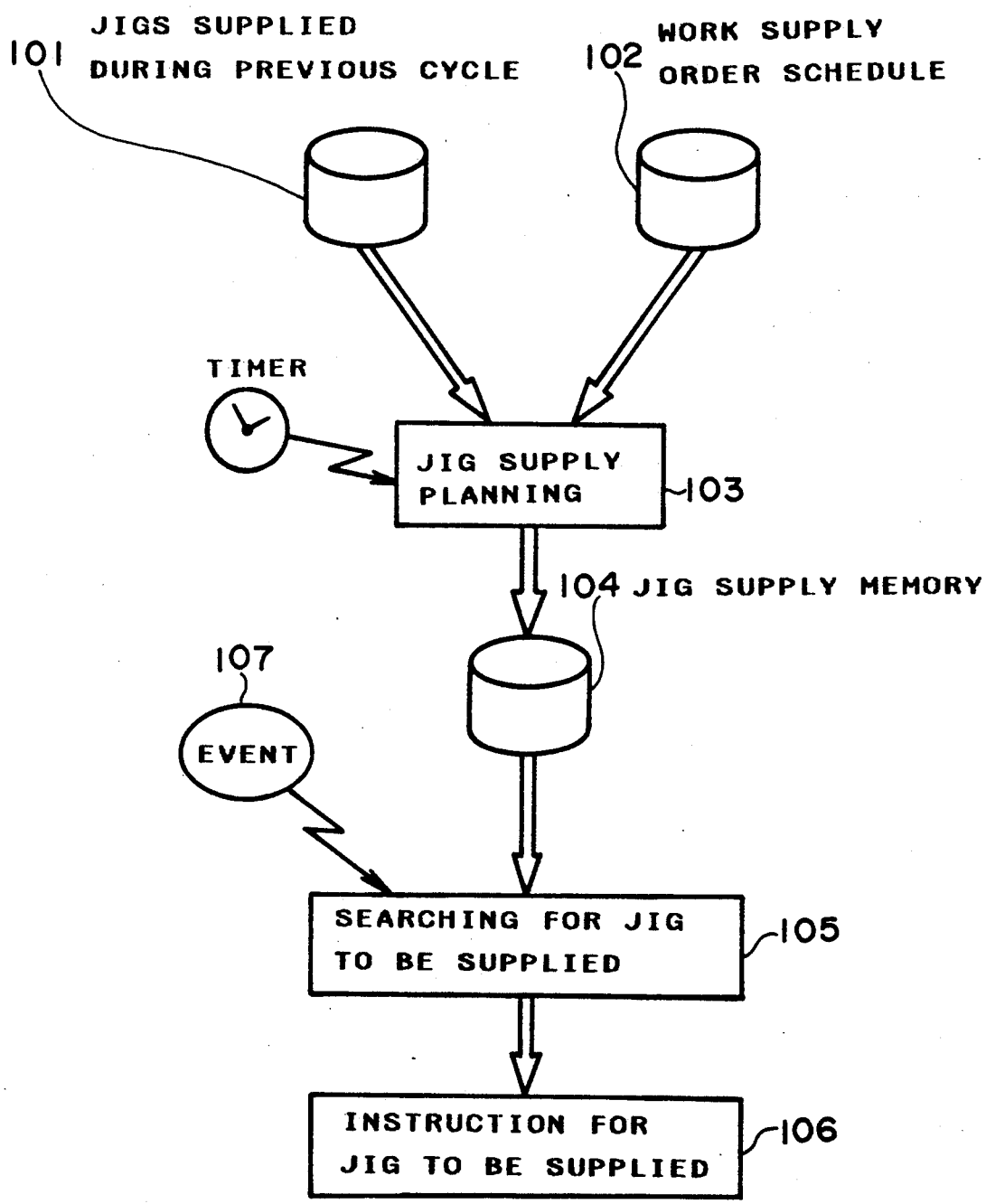
FIG. 2 is a block diagram of a production instruction device of the control apparatus of FIG. 1.

The production instruction device 1 has a control structure as illustrated in FIG. 2. More particularly, the production instruction device 1 includes a file storage device 101 which stores a jig supply order schedule for the previous cycle of operation, a file storage device 102 which stores a work supply order schedule for the current cycle of operation, means 103 for planning a jig supply order schedule for the current cycle of operation on the basis of the data from the files 101 and 102, and a file storage device 104 for storing the planned jig supply order schedule for the current cycle of operation. The production instruction device 1 further includes means 105 for searching the stored jig supply order schedule for the current cycle of operation of file 104 upon receiving a datum request signal 107 from the jig exchanging device 72 of the jig stocker 18 so as to find a corresponding datum (a datum regarding which jig should be took out from the rack of the jig stocker 18 and be mounted on the AGV 71 so as to be carried to a particular station of a particular cell) and means 106 for sending a signal of the corresponding datum to the jig exchanging device 72.

More particularly, the file 101, storing the record of the order of jigs scheduled to be supplied during the previous cycle of operation, includes a table as shown in FIG. 3. The table has columns titled month series number, workpiece type number, cell number, and jig number. The month series number indicates the numbers of workpieces, in the order of which the workpieces are scheduled to be supplied to the FMS line for the month; the workpiece type number indicate the type or kind of the workpiece written in the month series column; the cell number indicates the number i of the cell Ui where the workpiece written in the month series column is to be machined; and the jig number indicates the kind of the jig to be coupled to the workpiece written in the month series column. The jig number is automatically determined from the corresponding type of workpiece and the corresponding cell number. The table of FIG. 3 illustrates the last portion of the jig supply order schedule for the previous cycle of operation. FIG. 3 shows an example where four workpieces having the month series number 7, 8, 9, and 10 were scheduled to be supplied during the previous cycle of operation and the number of cells was four, though the number of workpieces is not limited to four and the number of cells is not limited to four. In the example of FIG. 3, at the end of the previous cycle of operation, the workpiece whose month series number is 7 was about to be processed in cell 4 (the last cell), workpiece 8 was about to be processed in cell 3, workpiece 9 was about to be processed in cell 2, workpiece 10 was about to be processed in cell 1. Then, workpiece 8 was to move to cell 4, workpiece 9 to cell 3, and workpiece 10 to cell 2. Finally, workpiece 10 was to be processed in cells 3 and 4.

Therefore, from the table of FIG. 3 it is known which jigs and/or jigs with workpieces are on the FMS line and at which stations the jigs and/or jigs with workpieces are present at the beginning of the current cycle of operation. This status has to be taken into consideration when the schedule for supplying jigs for the current cycle of operation is planned. Otherwise, the jigs and/or the jigs with workpieces for the current cycle of operation will interfere with the remaining jigs and jigs with workpieces from the previous cycle of operation.

The table 3 includes vacant lines into which workpieces to be supplied at the successive cycle of operation (that is, the current cycle of operation) are to be written. At the last stage of the previous cycle of operation, the vacant lines could not be filled, because workpieces to be supplied at the successive cycle of operation were not yet known. For example, in the table of FIG. 3, the fifth line is vacant, where a workpiece to be supplied at the successive cycle of operation and to be machined at the cell of number 1 should be inserted but such a workpiece was not yet known at the last stage of the previous cycle of operation.

Figures 4, 6:
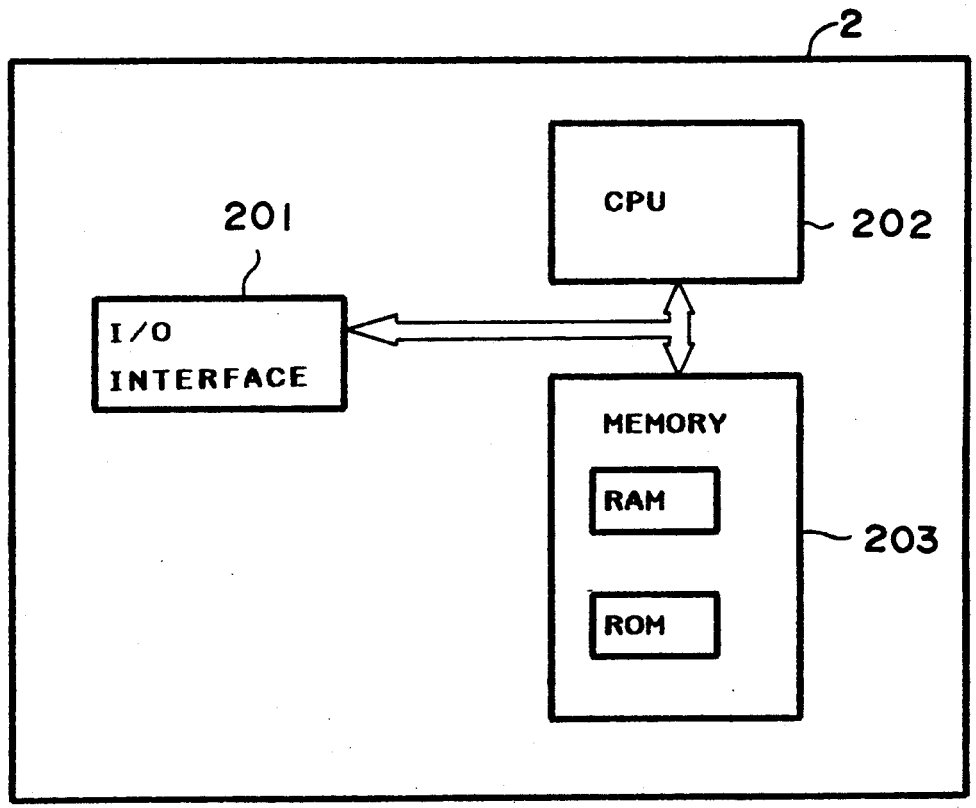
FIG. 4 is a table illustrating one example of the contents of a file of the production instruction device of FIG. 2 including a work supply order schedule for the current cycle.
FIG. 6 is a block diagram of an AGV movement control device of the control apparatus of FIG. 1.

The file 102, storing the work supply order schedule for the current cycle of operation, includes a table as shown in FIG. 4. The table of FIG. 4 has a column for a month series number (with the same meaning as the month series number of FIG. 3) relating to the current cycle of operation, a column with the name of the workpiece, and a column with the number of the type of workpiece. Workpieces are supplied to the machining line in accordance with the sequence of workpieces specified in the month series number column of FIG. 4. In the example of FIG. 4, the workpieces to be supplied during the current cycle of operation have the month series numbers 11, 12, 13, and 14, and the workpieces are supplied to the machining line in the order of the month series numbers 11, 12, 13 and 14. Thus, the 1S cam housing will be processed first through four sequential cells, followed by the 2S head, the 5MG cam housing, and 5MG head.

The means 103 for planning a jig supply order schedule for the current cycle of operation writes the workpieces of FIG. 4 for the current cycle of operation in the vacant lines of the table of FIG. 3 for the previous cycle of operation in the order of the sequential cell numbers (except a particular cell where a workpiece is not be machined) and plans a jig supplying schedule for the current cycle of operation as shown in FIG. 5. Thus, initially a jig will be supplied to cell 1 for workpiece 10, cell 2 for workpiece 9, cell 3 for workpiece 8 and cell 4 for workpiece 7 (all left over from the previous cycle). Then, a jig will be supplied to cell 1 for new workpiece 11 (from the schedule for the current cycle) and workpieces 8, 9, and 10, having moved to cells 4, 3 and 2, respectively, will also be supplied jigs. Then, a jig will be supplied to cell 1 for a new workpiece 12 (from the schedule for the current cycle) and workpieces 11 and 10, having moved to cells 2 and 3, respectively, will also receive jigs. The remainder of the schedule in FIG. 5 can be described in the same manner as set forth above. Also in FIG. 5, the jig number is determined from the type of workpiece and the cell number as in FIG. 3. The schedule for supplying jigs during the current cycle of operation includes the month series number of the remaining jigs and/or jigs with workpieces from the previous cycle of operation at a comparatively early stage thereof. However, as the current cycle proceeds, the remaining workpieces will be expelled to the machined workpiece stocker 67 by the robot 70, and after all the workpieces from the previous cycle of operation have been expelled to the machined workpiece stocker 67, only the workpieces of the current cycle of operation which corresponds to the workpieces of FIG. 4 flow on the FMS line. In FIG. 5, the twentieth line is vacant, because a workpiece to be written in the twentieth line is determined by a workpiece which will be supplied at the next cycle of operation and which is not yet known at the end of the current cycle of operation, just like the fifth line of the table of FIG. 3. The means 104 stores the planned schedule of the table of FIG. 5 in a file.

The jig supply order schedule of the table of FIG. 5 is made on the propositions that workpieces are supplied to the machining line in the order of month series numbers and that a workpiece supplied at a later time does not outrun and overlap with a workpiece supplied at a previous time. The robot 70 moves the workpieces in sequence for each cell to the next cell. The jig which has been selected according to the table of FIG. 5 and is carried by the AGV 71 to the cell specified by the table of FIG. 5 necessarily meets a corresponding workpiece to which the jig is to be coupled.

The AGV movement control device 2, comprising a computer, causes the AGV 71 to move to an available station (defined as a station where the AGV can perform an operation) and to execute an operation. Whether a station is available or not is determined from (a) the presence or absence of a jig and/or a jig with a workpiece at an object station to which the AGV is about to be processed as determined by sensors 20A, 25A, 26A, 31A, etc. and (b) the kind of the cell including the object station (that is, whether or not the workpiece is to be machined at the machining center of the cell). Whether a workpiece should be machined or not at a particular station has been determined when the jig exchanging device 72 receives an instruction from the production instruction device 1. The table of FIG. 5 shows one example where cell 4 is skipped between the eleventh line and the twelfth line. This means that the workpiece with month series number 9 in the seventh line of the table of FIG. 5 is scheduled to pass through the cell 4 without being machined at the machining center M4 of cell 4. Further, if any particular station is not available, the AGV is controlled so as to skip the unavailable station and move on to supply a jig to the next available station.

More particularly, the AGV movement control device 2 comprises a computer including an input/output interface 201, a central processor unit (CPU) 202, and a memory 203 including a random access memory (RAM) and a read only memory (ROM) as shown in FIG. 6. Signals regarding the presence or absence of a jig and/or a jig with a workpiece from the sensors 68A, 20A, 22A, 23A, 25A, 26A, 28A, 29A, 31A, 32A, 34A, 35A, and 37A of FIG. 1 are sent as inputs to the I/O interface 201 via an input communication network including lines 68, 20, 22, 23, 25, 26, 28, 29, 31, 32, 34, 35, and 37. An instruction output from the AGV movement control device 2 is sent to the AGV 71 via an output communication network including lines 38, 39, 40, 41, 42, and 43.

The memory 203 stores a decision table 204 (discussed in more detail with reference to FIG. 7) and a control flow diagram called a Petri net model 205 (discussed in more detail with respect to FIG. 8). The decision table 204 and the control flow diagram 205 are read from the memory 203 into the CPU 202. With respect to the object cell to which the jig selected at the jig stocker 18 is carried by the AGV 71, control operation of the AGV 71 is processed in the CPU 202. The outputs are sent to the AGV 71 through the I/O interface 201 and the output communication network.

The decision table 204 includes a matrix as shown in FIG. 7. Conditions R affixed with sequetial numbers (1, 2, . . ., 58) are inserted in boxes of the matrix to specify the statuses of each station of the object cell to which the jig selected at the jig stocker 18 is about to be processed according to the instruction from the production instruction device 1. For example, R3 specifies the condition where the status of the jig stocker 18 is a status A and the status of the loading station Li is a status B/C.

In the decision table 204 of FIG. 7, reference A indicates a status that there is an instruction from the production instruction device 1 to the jig stocker 18 that a jig should be supplied from the jig stocker 18 to a particular cell (object cell); reference A indicates an opposite status from status A; reference B indicates a status that a jig is present at an object station of the object cell; reference B indicates an opposite status from status B; reference C indicates a status that a jig with a workpiece is present at an object station of the object cell; and reference C indicates an opposite status from status C. The vertical subject columns and the horizontal subject lines of the matrix include statuses A and A with respect to the jig stocker 18; statuses B, C, and B/C (a status that neither a jig nor a jig with a workpiece are present) with respect to the loading station Li; statuses B, C, and B/C with respect to the unloading station Vi; statuses C and C with respect to the loading buffer BLi; and statuses C and C with respect to the unloading buffer BVi, in that order. Conditions R having affixed numbers different to each other, for example, the sequential numbers are inserted into boxes located above the diagonal of the matrix. Conditions to be inserted in boxes below the diagonal are symmetric to the conditions inserted in the boxes above the diagonal with respect to the diagonal. For example, when a jig with a workpiece is present at the loading station Li (and therefore, a status C exists at Li in the vertical column) and when a jig with a workpiece is not present at the loading buffer station BLi (and therefore, a status C exists at BLi in the horizontal line), the condition inserted in the box located at the intersection thereof is referred to as R36. In this way, all the statuses of the stations of the object cell can be specified by the conditions R. The conditions R thus indicated are provided to the control flow diagram 205 of FIG. 8 in the CPU 202 and operation of the AGV 71 is controlled in accordance with the control flow diagram 205.

As shown in FIG. 8, the control flow diagram 205 includes a step S06 where the AGV 71 arrives at the jig stocker 18 of an object cell Ui, a step S07 where the jig exchanging device 72 mounts a jig on the AGV 71 at the jig stocker 18, a step S08 where the AGV 71 leaves the jig stocker 18, a step S09 where the AGV 71 arrives at the loading station Li, a step S10 where a jig is moved from the AGV 71 to the loading station Li, a step S11 where a jig with a workpiece is moved from the unloading buffer BVi to the unloading station Vi, a step S12 where the AGV 71 leaves the loading station Li, a step S13 where the AGV 71 arrives at the unloading station Vi, a step S14 where a jig is mounted to the AGV 71 at the unloading station Vi, a step S15 where a jig with a work is moved from the loading station Li to the loading buffer BLi, and a step S16 where the AGV 71 leaves the unloading station Vi. Control flow lines are provided from the step S06 to the step S07, from the step S07 to the step S08, from the step S08 to the step S09, from the step S09 to the step S10, from the step S10 to the step S12, from the step S12 to the step S13, from the step S09 to the step S11, from the step S10 to the step S11, from the step S11 to the step S12, from the step S08 to the step S13, from the step S12 to the step S06, from the step S13 to the step S14, from the step S14 to the step S16, from the step S13 to the step S15, from the step S14 to the step S15, from the step S15 to the step S16, and from the step S16 to the step S06. Transition lines (shown by a line crossing the control flow line connecting the steps) are provided between the steps. Conditions R are affixed to the transition lines. In this instance, if the conditions affixed to each transition line are satisfied, the transition line can be passed through and control proceeds to the successive step along the control flow line. In contrast, if the conditions are not satisfied, the transition line can not be passed through until the conditions are finally satisfied. Some of the transition lines are affixed with a plurality of conditions combined by at least one reference "/" which means "or". In such a case, if at least one of the conditions combined by the "/" references is satisfied, the transition line can be passed through, and if none of the conditions is satisfied, the transition line can not be passed through. As shown in FIG. 8, a condition R3 is required between the steps S06 and S07; similarly, a condition R3 is required between the steps S07 and S08; a condition R53/R36/R4/R14/R21/R24/R27 is required between the steps S06 and S08; a condition R3/R53 is required between the steps S08 and S09; a condition R3 is required between the steps S09 and S10; a condition R53 is required between the steps S10 and S12; a condition R27/R36/R4/R14/R21/R24 is required between the steps S12 and S13; a condition R3 (an opposite status of R3) and R53 is required between the steps S09 and S11; a condition R53 is required between the steps S10 and S11; a condition R27/R36/R4/R14/R21/R24 is required between the steps S08 and S13; a condition R27/R36/R4/R14/R21/R24 is required between the steps S12 and S06; a condition R4/R14/R21/R24/R27 is required between the steps S13 and S14; a condition R36 is required between the steps S14 and S16; a condition R36 and R4/R14/R21/R24/R27 is required between the steps S13 and S15; and a condition R36 is required between the steps S14 and S15. Since no conditions are provided between the steps S11 and S12 and between the steps S15 and S16, control necessarily proceeds from the step S11 to the step S12 and from the step S15 to the step S16.

For example, when the AGV 71 is about to leave the jig stocker 18, the AGV moves for the loading station L1 of the object cell Ui, if the condition R3/ R53 is satisfied between the steps S08 and S09 at that time, that is, if the loading station Li is an available station. In contrast, if the condition R3/R53 is not satisfied between the steps S08 and S09 (which means that the loading station is an unavailable station) and if the condition R27/R36/R4/R14/R21/R24 is satisfied between the steps S08 and S13 (which means that the unloading station Vi is an available station), the AGV 71 skips the loading station Li and moves for the unloading station Vi. Control flow lines from the step S06 to the step S08, from the step S08 to the step S13, from the step S12 to the step S06, and from the step S16 to the step S06 are skipping flow lines. These skipping flow lines cause the AGV 71 to skip an unavailable station and to move to an available station to prevent the AGV from causing a dead lock.

The sensors 68A, 20A, 22A, 23A, 25A, 26A, 28A, 29A, 31A, 32A, 34A, 35A, and 37A of FIG. 1 are not required to recognize a pattern of a jig and/or a jig with a workpiece and need only recognize the presence or absence of a jig and/or a jig with a workpiece. Therefore, the sensors are less costly and the communication network including the lines 68, 20, 21, 23, 25, 26, 28, 29, 31, 32, 34, 35 and 37 is simplified and less costly. Also, because the communication network including the lines 38, 39, 40, 41, 42, and 43 to the AGV 71 need only send a signal indicating whether or not the AGV should be moved to a cell and is not required to send complicated signals concerning the type of jig to be carried at what timing, this network is also simplified and less costly.

The loading/unloading robot 70 carries a workpiece to be machined from the workpiece stocker 69 to a loading station L1 of the first stage cell U1, couples a jig to a workpiece at the loading station L1, separates a jig from a workpiece at the unloading station V1, and carries a separated workpiece to a loading station L2 of the next cell U2. The loading/unloading robot 70 repeats the operations with respect to all the cells U1, . . . , Un, and carries a workpiece from the unloading station Vn of the last stage cell Un to the machined workpiece stocker 67. Then the robot 70 repeats this process. Only a single loading/unloading robot 70 is provided and is commonly used to sequentially carry workpieces between the plural cells.

The loading/unloading robot 70 moves along the machining line in the order of increasing cell numbers and continuously from one cell to the cell with the next cell number. When the robot 70 leaves the cell with the final, greatest cell number "n", it returns to the cell with the initial, smallest cell number "1". Since the robot 70 moves in the order of increasing cell numbers, a workpiece does not outrun another workpiece. As a result, the workpiece supply order and the supplying of jigs in accordance with instructions from the production instruction device 1 are brought into coincidence.

Figure 9:
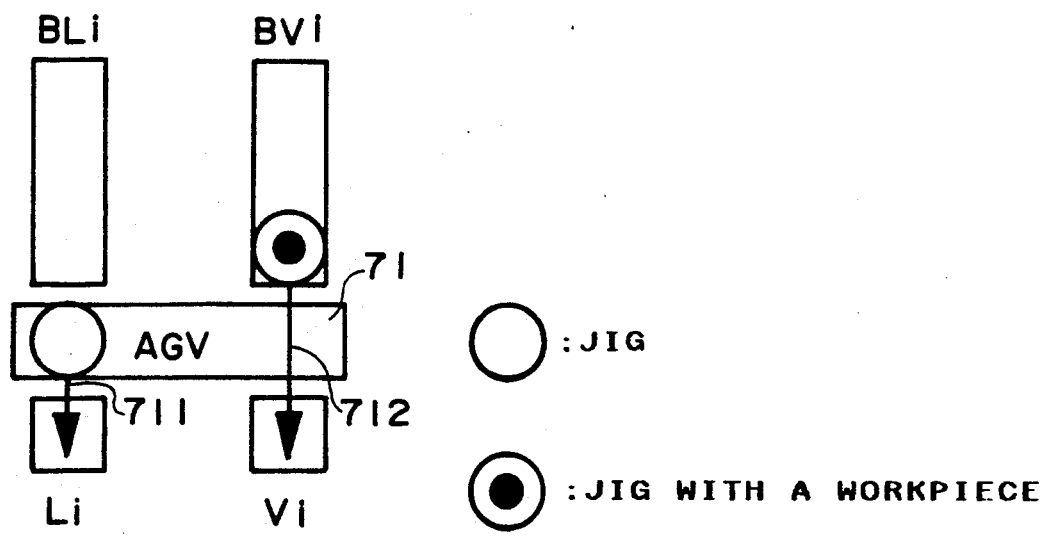
FIG. 9 is a schematic plan view of an AGV illustrating operation of one arm.
Figure 10:
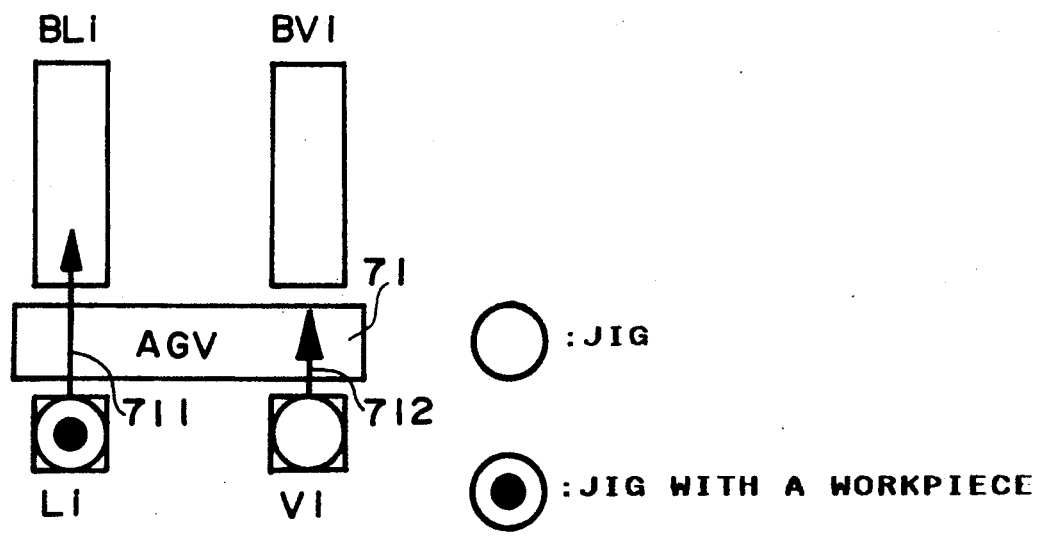
FIG. 10 is a schematic plan view of the AGV illustrating operation of another arm.

The AGV 71 includes two arms which are shown as arrows 711 and 712 in FIGS. 9 and 10. As illustrated in FIGS. 9 and 10, one arm 711 operates to dismount a jig from the AGV 71 to the loading station Li and to move a jig with a workpiece from the loading station Li to the loading buffer BLi, and another arm 712 operates to move a jig with a workpiece from the unloading buffer BVi to the unloading station Vi and to mount a jig from the unloading station Vi on the AGV 71. The two arms are designed to operate independently of each other and to be able to operate at the same time. As a result, the handling speed is doubled.

Next, operation of the FMS line of the present invention will be explained with reference to FIG. 1.

Various kinds of workpieces are supplied from the workpiece stocker 69 to the machining line by the robot 70 (or manually) independently of the jig supplying by the AGV 71. Jig supplying is to be controlled so that each jig is supplied to a corresponding workpiece. The jig supplying is controlled by the production instruction device 1 and the AGV movement control device 2.

Firstly, operation of the production instruction device 1 will be explained taking an example of an FMS line having four cells with reference to FIGS. 2, 3, 4, and 5. Suppose that the file 101 stores a jig supply order schedule for the previous cycle of operation shown in the table of FIG. 3 and that the file 102 stores a work supply order schedule for the current cycle of operation shown in the table of FIG. 4. It is understood from the table of FIG. 3 that the jigs scheduled to be supplied during the previous operating cycle had month series numbers 7, 8, 9, and 10. Similarly, it is understood from the table of FIG. 4 that the jigs scheduled to be supplied for the present cycle of operation have the month series numbers 11, 12, 13 and 14. The means 103 writes the workpieces of the table of FIG. 4 in the vacant lines of the table of FIG. 3 in the order of cell numbers 1, 2, 3, and 4 except a cell where a workpiece is not machined to plan the jig supply order schedule for the present cycle of operation shown in the table of FIG. 5. The table of FIG. 5 is stores in the file 104. When the production instruction device 1 receives a datum request signal from the jig exchanging device 72 of the jig stocker 18 as an event 107, the means 105 searched the file 104 and selects a corresponding datum to send it to the jig exchanging device 72 through the means 106. The instructions from the production instruction device 1 to the jig exchanging device includes an instruction indicating which jig is to be selected and an instruction indicating which cell the jig is to be carried to.

Next, operation of the AGV movement control device 2 will be explained with reference to FIGS. 1, 6, 7, 8, 9, and 10. Signals regarding the presence or absence of jis or jigs with workpieces are sent from the sensors 20A, 22A, 23A, 25A, etc. to the AGV movement control device 2. Therefore, each condition R in the decision table 204 of FIG. 7. can be specified with respect to an object cell Ui to which the AGV 71 is instructed to move. The AGV 71 is controlled by the AGV movement control device 2 so as to perform operations at available stations of the cell Ui in accordance with the control flow of FIG. 8. For example, when the AGV 71 is about to leave the step S08, whether the condition R3/R53 given to the transition line between the steps S08 and S09 is satisfied or not is investigated. When the condition R3/R53 is satisfied, the AGV moves to the loading station Li to perform an operation at the step S09, because the loading station Li is an available station. In contrast, when the condition R3/R53 is not satisfied and if the condition R27/R36/R4/R14/R21/R24 is satisfied, the AGV 71 moves to the unloading station Vi, skipping the loading station Li, because the loading station is an unavailable station at that time. Thus, the AGV 71 does not cause a dead lock. When the AGV 71 has finished all the available operations, the AGV 71 returns to the jig stocker 18 to proceed the next processing.

The loading/unloading robot 70 supplies a workpiece from the work stocker 69 to the machining line, and carries it along the machining line. More particularly, the robot 70 couples a jig to a workpiece at the loading station L2, then separates a jig from a workpiece at the unloading station V1, and then carries the workpiece to a loading station L2 of the next stage cell. The robot 70 repeats the above-specified operations up to the last stage cell Un and carries a workpiece from the unloading station Vn of the last stage cell Un to the machined workpiece stocker 67. After that, the robot 70 returns to the initial workpiece stocker 69 and repeats the above-described operations.

In the above-described operations, when a jig is not present at a loading station Li or when a jig with a workpiece is not present at an unloading station Vi, the loading/unloading robot 70 stays at the station until a jig or a jig with a workpiece is finally carried to the station by the AGV 71. Since the robot 70 always moves from the loading station L1 to the unloading station Vi of each cell Ui and from one cell to the next cell in the order of increasing cell numbers, operational timing is automatically obtained among the three control systems: (a) the supplying of jigs from the jig stocker according to the instructions from the production instruction device 1; (b) operations of the AGV 71 in accordance with the AGV movement control device 2 including jig setting, a jig retrieval, movement of a jig with a workpiece from a loading station Li to a loading buffer LBi, and movement of a jig with a workpiece from an unloading buffer LVi to an unloading station Vi; and (c) operations of the loading/unloading robot 70 including coupling a jig to a workpiece and separating a jig from a workpiece.

In accordance with the present invention, the following effects are obtained:

(a) The control system of the FMS line is greatly simplified and less costly, because such an ID reader as was necessary in the prior art of FIG. 11 and a complicated communication network as was required to the prior art of FIG. 12 are not necessary to be provided in the present invention.

(b) Since tracking of all the jigs and workpieces using a large computer is unnecessary, the computer (AGV movement control device) used in the present invention can be of a small capacity.

(c) Due to the simplification of the control system, recovery from any trouble will be easy even if such a trouble may happen, and it is not necessary to stop a line for several days unlike the prior art.

(d) It is not necessary to provide many spare jigs at every station, because a dead lock does not happen in the present invention. As a result, due to the reduction of the number of jigs, the cost of the FMS line including the jigs will be greatly decreased.

(e) Even if a jig or a jig with a workpiece is not present and therefore the robot stops at the station, a dead lock does not happen, because the AGV finally brings a jig or a jig with a workpiece to the station and the robot begins to operate again.

Although only one embodiment of the present invention has been described above in detail, it will be appreciated by those skilled in the art that various modifications and alterations can be made to the particular novel teachings and advantages of the present invention. Accordingly, it is to be understood that all such modifications and alterations are included within the spirit and scope of the present invention as defined by the following claims.

What is claimed is:

1. A control apparatus provided for an FMS line, wherein the FMS line is provided with:
   a machining line including a plurality of cells arranged in series;
   a jig stocker stocking various kinds of jigs; and
   an AGV for carrying a jig between the jig stocker and the machining line;
   said control apparatus includes:
   a first file storage device for storing a jig supply order schedule for a previous cycle of operation, a second file storage device for storing a work supply order schedule for a current cycle of operation;
   a third file storage device for storing a planned jig supply order schedule for the current cycle of operation;
   a production instruction device which includes (a) means for planning and storing a jig supply order schedule for a current cycle of operation on the basis of jig supply order schedule for the previous cycle of operation and a work supply order schedule for the current cycle of operation, the jig supply order schedule for the previous cycle of operation includes a table having lines filled with workpieces scheduled to be supplied during the previous cycle of operation and vacant lines, the work supply order schedule includes a table having lines filled with workpieces scheduled to be supplied for the current cycle of operation, and the jig supply order schedule for the current cycle of operation includes a table which is constructed through writing the workpieces of the work supply order schedule for the current cycle of operation in the vacant lines of the table of the jig supply order schedule for the previous cycle of operation in the order of sequential cell numbers; and
   means for searching the stored jig supply order schedule for the current cycle of operation upon receiving a datum request signal from the jig exchanging device and indicating a corresponding datum to the jig exchanging device.

2. A control apparatus provided for an FMS line, wherein the FMS line is provided with:
   a machining line including a plurality of stations arranged in series;
   a jig stocker stocking various kinds of jigs, the jig stocker being provided with a jig exchanging device;
   an AGV for carrying a jig between the jig stocker and the machining line;
   said control apparatus comprising:
   a production instruction device include means for planning and storing a jig supply order schedule for a current cycle of operation on the basis of a jig supply order schedule for the previous cycle of operation and a work supply order schedule for the current cycle of operation, and
   means for searching the stored jig supply order schedule for the current cycle of operation upon receiving a datum request signal from the jig exchanging device and indicating a corresponding datum to the jig exchanging device;
   an AGV movement control device including,
   (a) a decision table for specifying conditions of each cell regarding the presence or absence of a jig or a jig with a workpiece; and
   (b) a control flow diagram including a plurality of AGV operational steps, control flow lines connecting the steps, transition lines provided to the control flow lines, and
   conditions provided to the transition lines, transition of the AGV operation from one step to another step being allowed when the conditions provided to the transition line provided between said one and another steps are satisfied, the control flow lines including skipping flow lines so that when the station which the AGV is about to be processed is an unavailable station, the AGV is controlled so as to move to skip operations at the steps belonging to the unavailable station for causing the AGV to move to an available station where the AGV can perform an operation, skipping an unavailable station, in accordance with conditions of corresponding stations of the machining line including;
   (a) the presence or absence of a jig or a jig with a workpiece at stations of a cell to which a jig selected at the jig stocker is to be carried and (b) a kind of the cell to which the selected jig is to be carried; and
   loading/unloading means for coupling a jig to a workpiece at a loading station of one cell, then separating a jig from a workpiece at an unloading station of the same cell, and then carrying the separated workpiece from the unloading station of the same cell to a loading station of the next cell.

3. A control apparatus provided for an FMS line, wherein the FMS line is provided with:
   a machining line including a plurality of cells arranged in series;
   a jig stocker stocking various kinds of jigs; and
   an AGV for carrying a jig between the jig stocker and the machining line;
   said control apparatus including:
   a producing instruction device which includes (a) means for planning and storing a jig supply order schedule for a current cycle of operation on the basis of a jig supply order schedule for the previous cycle of operation and a work supply order schedule for the current cycle of operation and (b) means for searching the stored jig supply order schedule for the current cycle of operation upon receiving a datum request signal from the jig exchanging device and indicating a corresponding datum to the jig exchanging device, the jig supply order schedule for the previous cycle of operation includes a table having lines filled with workpieces scheduled to be supplied during the previous cycle of operation and vacant lines; the work supply order schedule includes a table having lines filled with workpieces scheduled to be supplied for the current cycle of operation; and the jig supply order schedule for the current cycle of operation includes a table which is constructed through writing the workpieces of the work supply order schedule for the current cycle of operation in the vacant lines of the table of the jig supply order schedule for the previous cycle of operation in the order of sequential cell numbers;
   an AGV movement control device for causing the AGV to move to an available station where the AGV can perform an operation, skipping an unavailable station, in accordance with conditions of corresponding stations of the machining line, said AGV movement control device including,
   (a) a decision table for specifying conditions of each station regarding the presence or absence of a jig or a jig with a workpiece; and
   (b) a control flow diagram including a plurality of AGV operational steps, control flow lines connecting the steps, transition lines provided to the control flow lines, and conditions provided to the transition lines, transition of the AGV operation from one step to another step being allowed when the conditions provided to the transition line provided between said one and another steps are satisfied, the control flow lines including skipping flow lines to that when the station which the AGV is about to be processed is an unavailable station, the AGV is controlled so as to move to skip operations at the steps belonging to the unavailable station.

4. A control apparatus provided for an FMS line, wherein the FMS line is provided with:
   a machining line having a plurality of cells arranged in series, each cell including a loading station, a loading buffer, a machining center, an unloading buffer, and an unloading station;
   a jig stocker for stocking jigs, the jig stocker being provided with a jig exchanging device; and
   an AGV for carrying a jig between the jig stocker and the machining line;
   said control apparatus comprising:
   a production instruction device including a first file storage device for storing a jig supply order schedule for a previous cycle of operation, a second file storage device for storing a work supply order schedule for a current cycle of operation a third file storage device for storing a planned jig supply order schedule for the current cycle of operation; means including the first, second, and third storage divisions for planning and storing a jig supply order schedule for a current cycle of operation on the basis of a jig supply order schedule for the current cycle of operation and a work supply order schedule for the previous cycle of operation and a work supply order schedule for the current cycle of operation, the jig supply order schedule for the previous cycle of operation includes a table having lines filled with workpieces scheduled to be supplied during the previous cycle of operation and vacant lines, the work supply order schedule includes a table having lines filled with workpieces scheduled to be supplied for the current cycle of operation, and the jig supply order schedule for the current cycle of operation includes a table which is constructed through writing the workpieces of the work supply order schedule for the current cycle of operation in the vacant lines of the table of the jig supply order schedule for the previous cycle of operation in the order of sequential cell numbers, means for searching the stored jig supply order schedule for the current cycle of operation upon receiving a datum request signal for the jig exchanging device and indicating a corresponding datum to the jig exchanging device;
   an AGV movement control device for causing the AGV to move to perform an operation at an available station, skipping an operation at an unavailable station in accordance with (a) the presence or absence of a jig or a jig with a workpiece at stations of a cell to which a jig selected at the jig stocker is to be carried and (b) a kind of the cell to which the selected jig is to be carried; and
   loading/unloading means for coupling a jig to a workpiece at loading station of one cell, then separating a jig from a workpiece at an unloading station of the same cell, and then carrying the separated workpiece from the unloading station of the same cell to a loading station of the next cell.

5. The control apparatus for an FMS line according to claim 4, wherein a sensor capable of detecting the presence or absence of a jig or a jig with a workpiece is provided at each of a loading station, a loading buffer, an unloading buffer, and an unloading station of each cell, the sensor being incapable of recognizing a pattern, and each sensor being electrically connected to the AGV movement control device.

6. The control apparatus for an FMS line according to claim 4, wherein the loading/unloading means includes a loading/unloading robot which is predetermined so as to move sequentially from each cell to the next adjacent cell so that the robot couples a jig to a workpiece at a loading station of one cell, then separates a jig from a workpiece at an unloading station of the same cell, and then carries the separated workpiece from the unloading station of the same cell to a loading station of the next cell.

7. The control apparatus for an FMS line according to claim 6, wherein the loading/unloading robot includes: a first arm for dismounting a jig from the AGV to a loading station and carrying a jig with a workpiece from a loading station to a loading buffer, and a second arm for carrying a jig with a workpiece from an unloading buffer to an unloading station and mounting a jig from an unloading station onto the AGV, the two arms being capable of operation independently of each other.

8. A control apparatus provided for an FMS line, wherein the FMS line is provided with:
- a machining line having a plurality of cells arranged in series, each cell including a loading station, a loading buffer, a machining center, an unloading buffer, and an unloading station;
- a jig stocker for stocking jigs, the jig stocker being provided with a jig exchanging device; and
- an AGV for carrying a jig between the jig stocker and the machining line;

said control apparatus comprising:
- a production instruction device including (a) means for planning and storing a jig supply order schedule for a current cycle of operation on the basis of a jig supply order schedule for the previous cycle of operation and a work supply order schedule for the current cycle of operation and (b) means for searching the stored jig supply order schedule for the current cycle of operation upon receiving a datum request signal from the jig exchanging device and indicating a corresponding datum to the jig exchanging device;
- an AGV movement control device including,
- (a) a decision table for specifying conditions of each station regarding the presence or absence of a jig or a jig with a workpiece, and
- (b) a control flow diagram including a plurality of AGV operational steps, control flow lines connecting the steps, transition lines provided to the control flow lines, and conditions provided to the transition lines, transition of the AGV operation from one step to another step being allowed when the conditions provided to the transition line provided between said one and another steps are satisfied, the control flow lines including skipping flow lines so that when the station which the AGV is about to be processed is an unavailable station, the AGV is controlled so as to move to skip operations at the steps belonging to the unavailable station for causing the AGV to move to perform an operation at an available station, skipping an operation at an unavailable station in accordance with (a) the presence or absence of a jig or a jig with a workpiece at stations of a cell to which a jig selected at the jig stocker is to be carried and (b) a kind of the cell to which the selected jig is to be carried; and
- loading/unloading means for coupling a jig to a workpiece at a loading station of one cell, then separating a jig from a workpiece at an unloading station of the same cell, and then carrying the separated workpiece from the unloading station of the same cell to a loading station of the next cell.

9. The control apparatus for an FMS lines according to claim 8, wherein a sensor capable of detecting the presence or absence of a jig or a jig with a workpiece is provided at each of a loading station, a loading buffer, an unloading buffer, and an unloading station of each cell, the sensor being incapable of recognizing a pattern, and each sensor being electrically connected to the AGV movement control device.

10. The control apparatus for an FMS line according to claim 8, wherein the loading/unloading means includes a loading/unloading robot which is predetermined so as to move sequentially from each cell to the next adjacent cell so that the robot couples a jig to a workpiece at a loading station of one cell, then separates a jig from a workpiece at an unloading station of the same cell, and then carries the separated workpiece from the unloading station of the same cell to a loading station of the next cell.

11. The control apparatus for an FMS line according to claim 10, wherein the loading/unloading robot includes two arms: a first arm for dismounting a jig from the AGV to a loading station to a loading buffer, and a second arm for carrying a jig with a workpiece from an unloading buffer to an unloading station and mounting a jig from an unloading station onto the AGV, the two arms being capable of operating independently of each other.

* * * * *